(12) United States Patent
Scholz

(10) Patent No.: US 12,533,216 B2
(45) Date of Patent: Jan. 27, 2026

(54) IMPLANT, ABUTMENT AND IMPLANT SYSTEM

(71) Applicant: medentis medical GmbH, Bad Neuenahr-Ahrweiler (DE)

(72) Inventor: Alexander Scholz, Bad Neuenahr-Ahrweiler (DE)

(73) Assignee: medentis medical GmbH, Bad Neuenahr-Ahrweiler (DE)

( * ) Notice: Subject to any disclaimer, the term of this patent is extended or adjusted under 35 U.S.C. 154(b) by 400 days.

(21) Appl. No.: 17/999,130

(22) PCT Filed: May 21, 2021

(86) PCT No.: PCT/EP2021/063644
§ 371 (c)(1),
(2) Date: Nov. 17, 2022

(87) PCT Pub. No.: WO2021/234142
PCT Pub. Date: Nov. 25, 2021

(65) Prior Publication Data
US 2023/0190420 A1      Jun. 22, 2023

(30) Foreign Application Priority Data

May 22, 2020   (DE) .................... 10 2020 113 824.5

(51) Int. Cl.
*A61C 8/00*        (2006.01)
(52) U.S. Cl.
CPC ............ *A61C 8/006* (2013.01); *A61C 8/0056* (2013.01); *A61C 8/0069* (2013.01); *A61C 8/0074* (2013.01)

(58) Field of Classification Search
CPC ..... A61C 8/006; A61C 8/0056; A61C 8/0069; A61C 8/0074; A61C 8/0048; A61C 8/0075
USPC ....................................... 433/172–176, 201.1
See application file for complete search history.

(56) References Cited

U.S. PATENT DOCUMENTS

| 5,782,918 A | 7/1998 | Klardie et al. |
| 2010/0105008 A1 | 4/2010 | Powell et al. |

FOREIGN PATENT DOCUMENTS

| AU | 2014235703 A1 * | 11/2015 | ........... A61C 8/0069 |
| DE | 102008011963 A1 | 9/2009 | |
| DE | 102008027007 A1 | 12/2009 | |
| DE | 202012003003 U1 | 7/2012 | |

(Continued)

OTHER PUBLICATIONS

European Patent Office; International Search Report; Aug. 5, 2021; entire document.

*Primary Examiner* — Eric J Rosen
*Assistant Examiner* — Mirayda A Aponte
(74) *Attorney, Agent, or Firm* — Price Heneveld LLP

(57) ABSTRACT

A dental implant for an implant system includes an internal implant-sided arrangement area, wherein the implant-sided arrangement area is configured to contact an abutment at least in sections, wherein the implant-sided arrangement area has an implant-sided conical section, wherein the implant-sided conical section comprises implant-sided anti-rotation structures, wherein the implant extends in a longitudinal direction, and wherein the implant-sided anti-rotation structures are configured such that they positively prevent or can prevent a rotation of the abutment about the longitudinal direction relative to the implant.

18 Claims, 2 Drawing Sheets

(56) References Cited

FOREIGN PATENT DOCUMENTS

| DE | 102012111993 A1 | 6/2013 | | |
|----|----|----|----|----|
| WO | WO-03024352 A1 | * | 3/2003 | ........... A61C 8/0048 |
| WO | WO-2012085039 A1 | * | 6/2012 | ........... A61C 8/0048 |

* cited by examiner

IMPLANT, ABUTMENT AND IMPLANT SYSTEM

BACKGROUND OF THE INVENTION

The invention relates to an implant, an abutment for an implant and an implant system, in particular for the dental field.

Implant systems in the dental field are already known from the prior art; they are used to anchor dental crowns or similar dental prostheses in a jaw. The implant systems known from the prior art include, among other things, an implant and an abutment, wherein the implant serves to be anchored in the jaw and the abutment serves to support the dental prostheses and to be positioned opposite the implant. In order to prevent relative rotation between the abutment and the implant, these two elements each have complementary form-fitting rotation locks in an anti-rotation area. In addition, it is also known to provide the abutment and the implant with complementary conical areas to minimize the penetration of bacteria into the space between the implant and the abutment. However, the problem with these already known implant systems is that the provision of the conical section and the anti-rotation area results in a particularly thin wall thickness. This leads both to poor manageability of the system and to the fact that bone augmentation usually has to be performed on the patient prior to insertion of the implant system, which represents an additional source of danger and stress for the patient because the implants have too large a diameter to meet the required minimum permanent load values.

It is therefore the object of the present invention to create an implant option that is easy to handle and poses only a low burden and risk to the patient, and with a minimal diameter meets all requirements, especially with regard to permanent load.

SUMMARY OF THE INVENTION

According to the invention, an implant, in particular a dental implant, for an implant system comprises an implant-sided arrangement area, in particular an internal implant-sided arrangement area, wherein the implant-sided arrangement area is designed to contact an abutment at least in sections, wherein the implant-sided arrangement area has an implant-sided conical section, wherein the implant-sided conical section comprises implant-sided anti-rotation structures, wherein the implant extends in a longitudinal direction, and wherein the implant-sided anti-rotation structures are configured to positively prevent, or are capable of preventing, rotation of the implant about the longitudinal direction relative to the abutment. The implant is intended to be arranged in a human tissue, in particular in a jaw of a human being. The implant is thereby advantageously part of an implant system, wherein such an implant system may also include, in addition to an implant, an abutment, a connecting threaded pin and/or a dental crown. The implant itself has an implantation area, in particular on its outer circumference, in order to be able to achieve an anchoring, in particular in a jaw of a human being. This implanting region is designed in particular as an external thread. The implant according to the invention extends along a longitudinal direction. This longitudinal direction is in particular the direction in which the length of the implant is determined. In other words, this can mean that the longitudinal direction is the direction in which the implant has its longest main extension. In order to create a connection to an abutment of an implant system, the implant has an implant-sided arrangement area. This implant-sided arrangement area is designed in particular so that it is located on the inside. This makes it possible to achieve a connection between the implant and the abutment that is particularly well sealed against bacteria. For example, the entire arrangement region is formed by a centrally arranged recess or is arranged within such a recess, this recess advantageously extending in the direction of the longitudinal direction. The implant-sided arrangement area has a conical section which is designed to contact a complementarily formed abutment-side conical section in an installed state. The primary function of the conical section is to prevent bacteria from entering between the implant and the abutment implant-sided. In other words, the implant-sided conical section serves to provide a seal, particularly to prevent bacteria from entering. According to the invention, this implant-sided conical section has implant-sided anti-rotation structures. These implant-sided anti-rotation structures are designed and/or configured in such a way that they positively prevent or can prevent rotation of the implant relative to an abutment about the longitudinal direction. In other words, the implant-sided anti-rotation structures are designed in such a way that they interact and/or can be engaged in a form-fitting manner with complementarily designed abutment-sided anti-rotation structures, so that a rotation about the longitudinal direction between the abutment and the implant is prevented in a form-fitting manner by the latter. By forming the implant-sided anti-rotation structures—at least—in the region of the implant-sided conical section, it can be achieved that the implants can have a particularly high wall thickness, so that the risk of the implant breaking can be reduced. Alternatively or additionally preferred, this combination of the implant-sided conical section and the implant-sided anti-rotation structures in one section means that the implants can be manufactured thinner and at the same time stable, so that bone augmentation can often be dispensed with, while at the same time still achieving a stable and mechanically loadable implant.

Advantageously, the implant-sided anti-rotation structures extend exclusively in the implant-sided conical section. In other words, this can mean that the implant-sided anti-rotation structures are only formed or present in the conical section. In this way, a particularly easy-to-fabricate implant can be achieved, since extensive machining must be performed exclusively in the implant-sided conical section. Alternatively or additionally preferred, the implant-sided anti-rotation structures do not extend only in the implant-sided conical section. In other words, this may mean that the anti-rotation structures extend beyond the implant-sided conical section, especially in the longitudinal direction. Therefore, it is possible in principle that the implant-sided anti-rotation structures are also present in the section or sections adjacent to the implant-sided conical section or extend into these areas. This makes it possible to achieve a particularly mechanically resilient form-fitted anti-rotation device, because it increases the available anti-rotation surface in particular, so that the surface pressures that occur can be reduced.

Usefully, the ratio of the length of the implant-sided anti-rotation structures in the longitudinal direction to the length of the implant-sided conical section in the longitudinal direction is in a range of 0.6 to 0.95, preferably in a range of 0.7 to 0.92, and particularly preferably in a range of 0.8 to 0.9. At a ratio in the range of 0.6 to 0.95, a particularly simple fabrication of the implant-sided anti-rotation structures can be achieved. If, on the other hand, the ratio is in a range of 0.7 to 0.92, the result is an implant that can be handled particularly well in a patient's mouth so that the patient's health risk can be reduced. With a ratio of the length of the implant-sided anti-rotation structures in the direction of the longitudinal direction to a length of the implant-sided conical section in the direction of the longitudinal direction in a range of 0.8 to 0.9, the applicant has surprisingly found that a particularly high degree of sealing effect against penetration of bacteria into the intermediate area between implant and abutment can be achieved.

Conveniently, the implant-sided conical section forms a distal end of the implant-sided arrangement area in the direction of the longitudinal direction. In this way, a particularly easy-to-fabricate implant can be achieved, so that costs can be saved. A distal end of the implant-sided arrangement area is understood to mean that the conical section limits the implant-sided arrangement area or forms its end section at least in one direction of the longitudinal direction. Advantageously, the implant-sided conical section forms a mouth area of the inner implant-sided arrangement area. In other words, this can mean that the implant-sided conical section forms in particular the distal end of the implant-sided arrangement area, which is furthest away from the jaw in the installed position.

The implant-sided arrangement area expediently has a cylindrical section, the cylindrical section being designed to form an axial guide for an abutment. This allows for axial guidance of the abutment during assembly of the abutment or arrangement of the abutment relative to the implant, making the abutment much easier to handle in a patient's mouth. In addition, the cylindrical section can also be used as a force transmission surface for radial and tangential forces, so that the mechanical load capacity can be increased by providing a cylindrical section.

In an advantageous further development, the cylindrical section adjoins the implant-sided conical section in the longitudinal direction. In this way, a particularly compact design can be achieved, so that the handling of the abutment can be further simplified during installation. Connecting means that the cylindrical section is directly adjacent to the implant-sided conical section as seen in the longitudinal direction, although a small transition phase or rounding can be provided between the cylindrical section and the implant-sided conical section, for example.

Advantageously, the implant-sided arrangement area has a threaded section, this threaded section serves in particular to be able to screw or brace an abutment to the implant. Therefore, the threaded section can be used in particular to brace the abutment with the implant via a connecting threaded pin.

Advantageously, the threaded section adjoins the cylindrical section in the longitudinal direction. This makes it possible to achieve a particularly compact construction or design of the implant.

The implant-sided conical section ideally has a region, in particular in the direction of the longitudinal direction, which is formed without an anti-rotation structure. In this way, a particularly high degree of sealing effect can be achieved, because at least a certain part of the conical section is exclusively conical due to the fact that the implant-sided conical section is free of anti-rotation structures at least in some areas, so that a particularly high degree of sealing effect can be achieved. A section free of an anti-rotation structure can be understood to mean, among other things, that a certain section is exclusively conical when viewed in the longitudinal direction.

In an advantageous further embodiment, the anti-rotation structure-free area of the implant-sided conical section forms an end section of the implant-sided conical section opposite the distal end of the implant-sided arrangement area in the longitudinal direction. This may further facilitate fabrication of the conical section, thereby saving costs. In other words, at least the portion of the implant-sided conical section may be formed free of anti-rotation structure, which is oriented in the direction of the centre of gravity of the implant. Therefore, for example, the section of the conical section that is further inward in the longitudinal direction can be formed free of anti-rotation structure. Alternatively or additionally preferably, in particular the region of the implant-sided conical section which is formed closest to the cylindrical section in the longitudinal direction may be free of anti-rotation structure. Further alternatively or further additionally preferably, that part of the implant-sided conical section which forms a distal end section of the implant-sided conical section in the direction of the longitudinal direction may also be formed free of anti-rotation structure. In other words, therefore, alternatively or additionally preferably also that region of the implant-sided conical section can be formed free of anti-rotation structure which, viewed in the longitudinal direction, points away from the cylindrical section. In an exemplary embodiment, the conical section can therefore have three areas, wherein, viewed in the longitudinal direction, there is initially an area free of anti-rotation structures, which is followed in the longitudinal direction by an area that has implant-sided anti-rotation structures, which is in turn followed in the longitudinal direction by a third area that is also free of anti-rotation structures.

Advantageously, the implant-sided anti-rotation structures each have at least one contact surface and/or the implant-sided anti-rotation structures are formed by a contact surface, the contact surfaces being flat and having a normal which lies in a plane spanned by a radial direction and the longitudinal direction. The radial direction points radially away from the longitudinal direction. In other words, in a cylindrical coordinate system, the longitudinal direction can form the height direction and the radial direction can form the radial direction. The contact surfaces are those surfaces of the anti-rotation structures which serve to make contact with, in particular, complementary surfaces of an abutment in order to achieve a form-fitting anti-rotation connection between the abutment and the implant. The flat design of the contact surfaces in such a way that these contact surfaces each have a normal which lies in a plane spanned by the radial direction and the longitudinal direction means that the implant-sided anti-rotation structure can be produced particularly easily. In addition, a particularly high degree of torque transmission can be achieved, resulting in a particularly resilient implant system.

It is expedient that the contact surfaces or the anti-rotation structures form a polygon, in particular a hexagon, especially in a plane perpendicular to the longitudinal direction. In this way, a particularly resilient form-fitted anti-rotation device can be achieved, resulting in a particularly mechanically resilient implant system or implant. In other words, the anti-rotation structures can be arranged, in particular in a cutting plane perpendicular to the longitudinal direction, in such a way that they form a polygon. A polygon can be, for example, a triangular, a square, a hexagon, an octagon, a Torx or hexagonal round, or an octagonal round.

Advantageously, the implant-sided anti-rotation structures are tapered in the direction of the longitudinal direction. This allows a particularly high degree of sealing effect to be achieved, because the tapered design of the implant-sided anti-rotation structures also allows them to achieve or provide a particularly high degree of sealing effect. In addition, this tapered design of the implant-sided anti-rotation structures can also make the anti-rotation structure more mechanically resilient, because this can increase the surface area available for positive torque transmission about the longitudinal direction, so that the surface pressure that occurs is reduced. A tapered design of the (implant-sided) anti-rotation structures can be understood to mean that the average distance of the anti-rotation structures from the longitudinal direction decreases along their course in the longitudinal direction. For example, this can be achieved by the anti-rotation structures being arrow-shaped in relation to the longitudinal direction.

In an advantageous further embodiment, the implant-sided anti-rotation structures, in particular the contact surfaces, form a first implant-sided taper angle with the longitudinal direction, in particular in a range of 8° to 14°, preferably in a range of 10° to 12°. By providing a taper angle, in particular constant in the longitudinal direction, between the implant-sided anti-rotation structures and the longitudinal direction, it can be achieved that the anti-rotation structures are particularly easy to manufacture. With an implant-sided taper angle in a range of 8° to 14°, the applicant has surprisingly found that a particularly high degree of sealing effect can be achieved. If the implant-sided taper angle is in a range of 10° to 12°, this can make the implant particularly easy to handle, because it can reduce the likelihood of the implant tilting relative to an abutment during assembly.

More appropriately, the implant-sided conical section forms an implant-sided conical angle with the longitudinal direction, wherein the implant-sided conical angle is in a range of 8° to 14°, preferably in a range of 10° to 12°. In other words, the pitch angle of the conical section or sections of the implant-sided conical section may form a conical angle with the longitudinal direction in a range of 8° to 14°, preferably in a range of 10° to 12°. Therefore, only the opening angle of the conically formed areas of the implant-sided conical section with the longitudinal direction is decisive for determining the implant-sided conical angle. Therefore, in particular, a possible angle is not decisive for the determination of the implant-sided conical angle, which the anti-rotation structures of the implant-sided conical section form with the longitudinal direction. With an implant-sided conical angle in the range of 8° to 14°, a particularly high degree of sealing effect can be achieved so that the penetration of bacteria is made more difficult. However, if the implant-sided conical angle is in the range of 10° to 12°, a particularly easy insertion of an abutment into the implant-sided conical section can be achieved, so that the assembly and especially the disassembly of the abutment can be facilitated.

A further aspect of the invention may relate to an abutment which is in particular adapted to be connected to an implant according to the invention. Such an abutment, in particular a dental implant abutment, for an implant system may comprise a connection area, in particular an external connection area, wherein the connection area is adapted to contact, at least in sections, an implant, in particular as described above and below, wherein the connection area has an abutment-side conical section, wherein the body-sided conical section has body-side anti-rotation structures, wherein the body extends in a longitudinal extension direction, and wherein the body-sided anti-rotation structures are formed such that they positively prevent or can prevent a rotation of the body about the longitudinal extension direction relative to the implant. By forming the abutment in such a way that the conical section on the abutment side has anti-rotation structures on the abutment side, a particularly compact abutment results which is nevertheless mechanically stable and can achieve a high sealing effect against the penetration of bacteria. With regard to the further possible advantages of this embodiment, reference should also be made to the above explanations concerning the embodiment of an implant according to the invention. In other words, the abutment may have the features, advantages, designs and/or embodiments of the implant set forth above in a complementary embodiment. Therefore, in particular, the features, advantages, designs and/or embodiments set forth above with respect to the implant may also be provided in an embodiment according to the invention, and vice versa. In the following, some of these features, advantages, designs and/or embodiments of the superstructure are set forth by way of example.

Advantageously, the body-sided anti-rotation structures extend exclusively in the body-sided conical section. This enables a particularly high sealing effect to be achieved. Alternatively or additionally, the body-sided anti-rotation structures extend completely beyond the body-sided conical section in the direction of elongation. In other words, the anti-rotation structures can extend from the body-sided conical section in the longitudinal direction of adjacent areas. In this way, a particularly resilient anti-rotation device can be achieved.

Advantageously, the ratio of the length of the body-sided anti-rotation abutment in the direction of longitudinal extension to the length of the body-sided conical section in the direction of longitudinal extension lies in a range of 0.6 to 0.95, preferably in a range of 0.7 to 0.92, and particularly preferably in a range of 0.8 to 0.9. A ratio of 0.6 to 0.95 results in an abutment that is particularly easy to manufacture. However, should the ratio be in a range of 0.7 to 0.92, a particularly easy-to-manufacture abutment can be achieved so that placement of the abutment in a patient's mouth can be simplified. A ratio in the range of 0.8 to 0.9 results in a particularly high sealing effect, so that the penetration of bacteria can be reduced or made more difficult.

Advantageously, the body-sided conical section forms a distal end of the connection area in the direction of the longitudinal extension direction. In other words, this can mean that the conical section in a distal direction in the direction of the longitudinal extension does not necessarily limit the abutment itself, but can close off that area of the abutment in the longitudinal direction which is designed to contact an implant. In this way, a particularly easy-to-manufacture abutment can be achieved, so that costs can be saved.

Advantageously, the connection area has an abutment-sided cylindrical section, wherein the abutment-sided cylindrical section is designed to form an axial guide, in particular, for example, in interaction with a cylindrical section of an implant. Hereby, a significant simplification of the handling in the mouth can be achieved, so that injuries of the patient during the assembly of the implant can be avoided. In addition, the cylindrical section can also be used to transmit tangential or radial forces, so that the mechanical load capacity can be increased by providing a cylindrical section in the abutment.

The cylindrical section on the body side adjoins the body-sided conical section in the longitudinal direction. This makes it possible to achieve a particularly compact design.

It is expedient that the body-sided anti-rotation structures each have at least one transmission area, preferably two transmission areas, the transmission areas being flat and having a normal which lies in a plane spanned by a radial direction and the longitudinal direction of extension. The radial direction forms a radial direction to the longitudinal extension direction. In other words, the longitudinal direction can form the height direction of a cylinder coordinate system and the radial direction can form the radial coordinate of the cylinder coordinate system. In general, it may apply that the radial direction is oriented parallel to the radial direction and the longitudinal extension direction is oriented parallel to the longitudinal direction in an assembled state of the abutment relative to an implant. By providing planar transmission surfaces which have a normal lying in a plane spanned by the radial direction and the longitudinal extension direction, a particularly easy-to-manufacture structure can be achieved, wherein such a structure can simultaneously enable a particularly high degree of torque transmission. The transmission surfaces of the anti-rotation structures are designed in particular to be complementary to the contact surfaces of the implant and to make surface contact with them. In other words, the transmission surfaces and the contact surfaces can form contacting surface pairs with each other in order to be able to transmit a torque between the abutment and the implant in a form-fitting manner about the longitudinal extension direction or about the longitudinal direction.

It is expedient that the transmission areas and/or the body-sided anti-rotation structures form a polygon, in particular a hexagon, especially in a plane perpendicular to the direction of longitudinal extension. This allows a particularly high degree of positive locking against rotation. In addition, a polygon can also be easily manufactured, resulting in a cost-effective structure. Advantageously, the abutment-sided polygon of the anti-rotation structures or of the transmission area is designed in such a way that it is complementary to a polygon formed by the contact surfaces of the implant.

It is expedient that the abutment-sided anti-rotation structures are tapered in the direction of the longitudinal extension. In other words, the abutment-sided anti-rotation structures can be tapered in a similar way as already described with regard to the implant and its contact surfaces or anti-rotation structures.

Advantageously, the transmission surfaces and/or the body-sided anti-rotation structures form a second taper angle with the longitudinal extension direction, in particular in a range from 8° to 14°, preferably in a range from 10° to 12°. In other words, the transmission areas and/or the body-sided anti-rotation structures can form a taper angle with the longitudinal extension direction. In this way, a particularly simple manufacture can be achieved. Should the second taper angle lie in a range of 8° to 14°, a particularly high degree of sealing effect can be achieved. However, if the second taper angle is in a range of 10° to 12°, a particularly easy handling of the abutment can be achieved hereby, because the probability of tilting of the abutment relative to an implant during assembly can be reduced thereby.

Advantageously, the body-sided conical section forms a body-sided cone angle with the longitudinal extension direction, the body-sided cone angle being in a range from 8° to 14°, preferably a range from 10° to 12°. In other words, the body-sided conical section with its exclusively conical regions can form a body-sided cone angle with the longitudinal extension direction. This body-sided taper angle is preferably in a range of 8° to 14°. This allows a high degree of sealing effect to be achieved by the body-sided conical section. However, if the abutment-sided cone angle is in a range of 10° to 12°, this can make the abutment particularly easy to handle, so that injuries to the patient can be prevented.

A further aspect of the invention may relate to an implant system, wherein the implant system comprises an implant, in particular as described above and below, and an abutment, in particular as described above and below, and a connecting threaded pin. In this way, the advantages described above regarding the implant or the abutment can also be realized in an implant system. The existing threaded connecting pin serves to brace the implant with the abutment.

BRIEF DESCRIPTION OF THE DRAWINGS

Further advantages and features of the present invention will be apparent from the following description with reference to the figures. Individual features of the embodiments shown can thereby also be used in other embodiments, unless this has been expressly excluded. Showing.

DETAILED DESCRIPTION OF THE PREFERRED EMBODIMENTS

Figure 1:
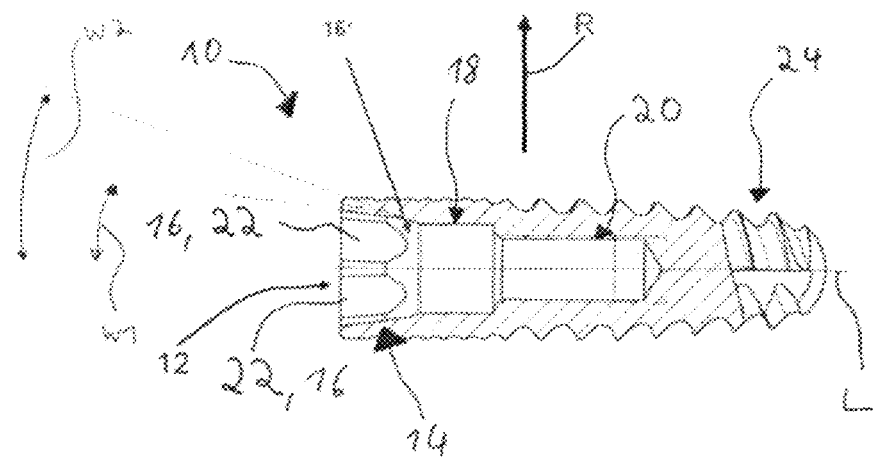
FIG. 1 is a longitudinal section through an implant.

In FIG. 1, an implant 10 is shown extending along a longitudinal direction L. In its outer area, the implant 10 has an implantation area 24 in the form of a thread. This implantation area 24 is designed to be arranged in a jaw of a patient. In other words, the implant 10 shown in FIG. 1 is therefore a dental implant. The implant-sided arrangement area 12 is arranged internally in the implant 10. This interior implant-sided arrangement area 12 has an implant-sided conical section 14, which has a basic conical configuration. This basic conical configuration of the implant-sided conical section 14 is thereby achieved by the fact that the perfectly conical configuration of the implant-sided conical section 14 is destroyed or broken through by the anti-rotation structures 16 present there. This implant-sided conical section 14 forms an implant-sided cone angle W2 with the longitudinal direction L, in particular as shown in a transition region to the cylindrical section 18. In the implant-sided conical section 14, the anti-rotation structures 16 are present in the form of contact surfaces 22. These contact surfaces 22 have a normal N, which lies in a plane formed by the longitudinal direction L and the radial direction R. The contact surfaces 22 thereby form a first implant-sided taper angle W1 with the longitudinal direction L. In the embodiment shown in FIG. 1, the implant-sided conical section 14 forms a distal end of the implant-sided arrangement area 12 in the direction of the longitudinal direction L. The implant-sided conical section 14 forms the implant-sided arrangement area 12. The implant-sided arrangement area 12 also has a cylindrical section 18, the cylindrical section 18 joining the implant-sided conical section 14 in the longitudinal direction L. In addition, the implant side arrangement area 12 also has a threaded section 20 which joins the cylindrical section 18 in the longitudinal direction L. The implant-sided conical section 14 ideally has a region 16', in particular in the direction of the longitudinal direction L, which is formed without an anti-rotation structure.

Figure 2:
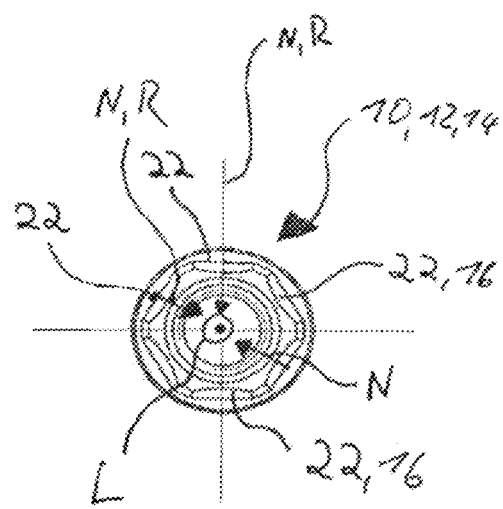
FIG. 2 is a frontal view of an implant.

FIG. 2 shows a frontal view in longitudinal direction L of the implant 10 or of the implant-sided arrangement area 12. The embodiment of the implant 10 shown in FIG. 2 can in principle match the embodiment shown in FIG. 1. The implant-sided arrangement area 12 has a polygon in a plane perpendicular to the longitudinal direction L, which is formed by the contact surfaces 22 or by the implant-sided anti-rotation structures 16. The implant-sided anti-rotation structures 16 are designed to taper in the direction of the longitudinal direction L. The contact surfaces 22 have a normal N, which lies in a plane formed by the longitudinal direction L and the radial direction R.

Figure 3:
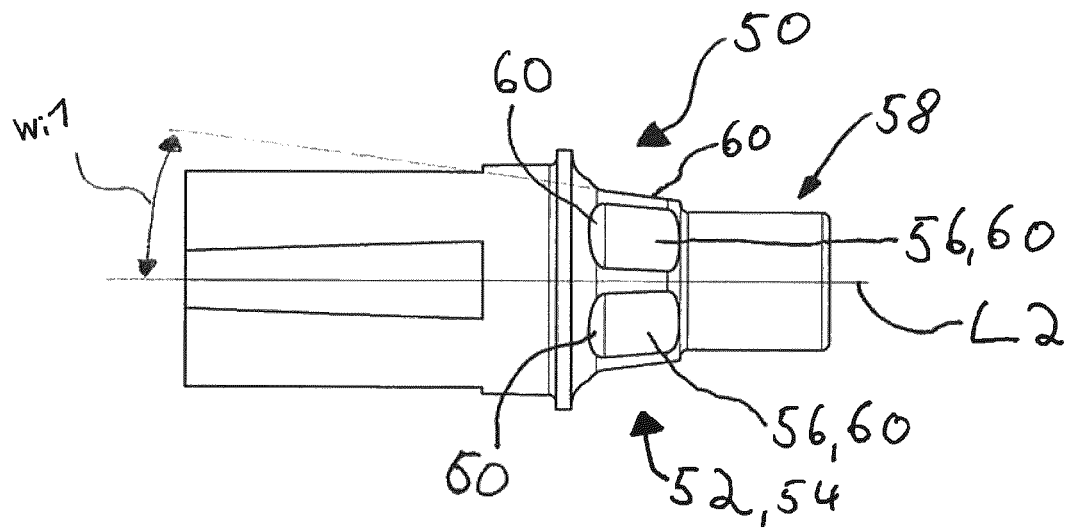
FIG. 3 is a side view of an abutment.

FIG. 3 shows an abutment 50 which is designed as a dental implant abutment. The abutment 50 has an external connection area 52, wherein this connection area 52 is designed to make contact with an implant 10, in particular with an implant-sided arrangement area 12 of an implant 10. The connection area 52 has a body-sided conical section 54, wherein body-sided anti-rotation structures 56 are arranged in the body-sided conical section 54. In the embodiment disclosed, these body-side anti-rotation structures 56 are formed as planar transmission areas 60. Adjacent to the body-sided conical section 54 is a body-sided cylindrical section 58 in the longitudinal extension direction L2. The transmission areas 60 or the anti-rotation structures 56 on the body side are formed tapering in the direction of the longitudinal extension direction L2 and form a second taper angle Wi1 with the longitudinal extension direction L2.

Figure 4:
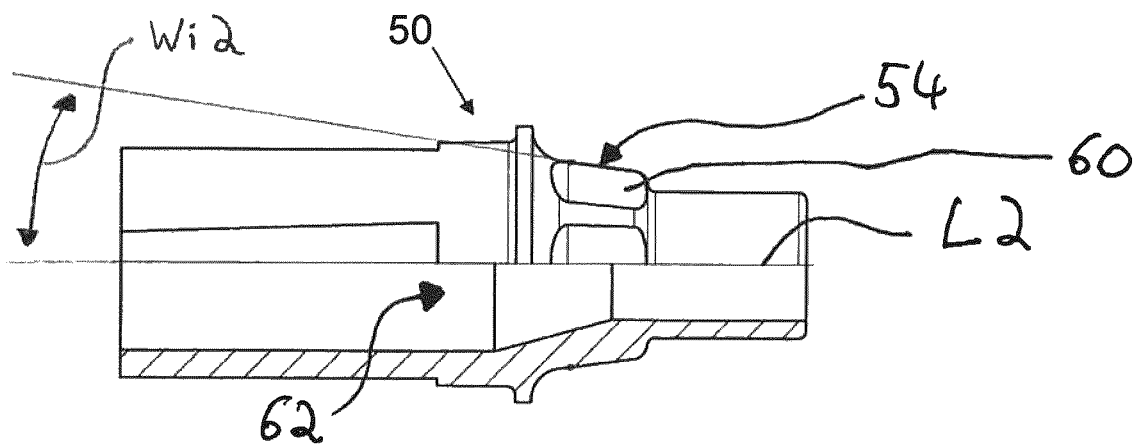
FIG. 4 is a partial longitudinal section along a structure according to the invention.

FIG. 4 shows a partial sectional view through an abutment 50. A clamping area 62 is arranged inside the abutment 50, which—as shown—can be at least partially conical and serves to clamp the abutment 50 to an implant 10 with the aid of a threaded connecting pin 80.

Figure 5:
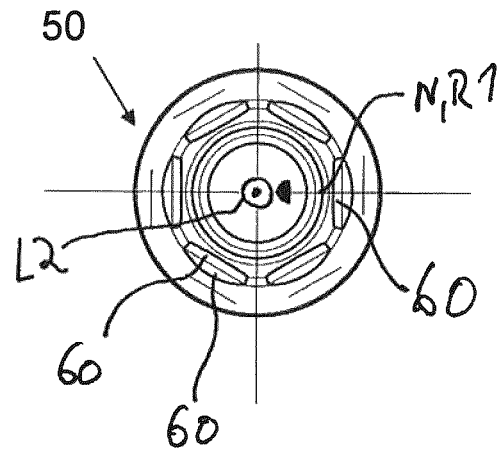
FIG. 5 is a frontal view along the longitudinal direction of extension of an abutment.

In FIG. 5, a frontal view in the longitudinal extension direction L2 of the abutment 50 is shown. The abutment 50 shown in FIG. 5 can thereby match the embodiment shown in FIG. 3 and/or the embodiment shown in FIG. 4. The structure 50 has a plurality of transmission surfaces 60, each of which has a normal N. This normal N lies in a plane which is spanned by the radial direction R1 and by the longitudinal extension direction L2. As can be seen from FIG. 5, the transmission surfaces 60 form a polygon in the form of a hexagon with one another in a plane which is perpendicular to the longitudinal extension direction L2.

LIST OF REFERENCE SIGNS

1—Implant system
10—Implant
12—Implant-sided arrangement area
14—implant-sided conical section
16—Implant-sided anti-rotation structure
18—cylindrical section
20—Threaded section
22—Investment area
24—Implantation area
50—Structure
52—Connection area
54—conical section on the body side
56—anti-rotation structures on the body side
58—cylindrical section on the body side
60—Transmission area
62—Clamping area
80—Connecting threaded pin
L—longitudinal direction
L2—longitudinal extension direction
N—Normal
R—radial direction
R1—Radial direction
W1—first taper angle
Wi1—second taper angle
W2—implant-sided cone angle
Wi2—body-sided cone angle

The invention claimed is:

1. A dental implant for an implant system, comprising:
an implant-sided arrangement area on an inside of the dental implant;
wherein the implant-sided arrangement area is configured to contact an abutment at least in sections;
wherein the implant-sided arrangement area has a cylindrical section, and wherein the cylindrical section is configured to form an axial guide for the abutment;
wherein the implant-sided arrangement area has an implant-sided conical section;
wherein the implant-sided conical section has implant-sided anti-rotation structures;
wherein the dental implant extends in a longitudinal direction;
wherein the implant-sided anti-rotation structures are configured to positively prevent rotation of the abutment about the longitudinal direction relative to the implant;
wherein each of the implant-sided anti-rotation structures:
1) have at least one contact surface and/or: 2) are formed by at least one contact surface;
wherein the contact surfaces are flat and define a normal which lies in a plane spanned by a radial direction and the longitudinal direction;
wherein the implant-sided anti-rotation structures are tapered in the direction of the longitudinal direction; and
wherein the implant-sided conical section has an area which is formed without anti-rotation structures.

2. The implant according to claim 1, wherein the implant-sided anti-rotation structures extend exclusively in the implant-sided conical section.

3. The implant according to claim 2, wherein the implant-sided conical section forms a distal end of the implant-sided arrangement area in the direction of the longitudinal direction.

4. The implant according to claim 3, wherein the cylindrical section joins the implant-sided conical section in the longitudinal direction.

5. The implant according to claim 3, wherein the implant-sided arrangement area has a threaded section.

6. The implant according to claim 5, wherein the threaded section joins the cylindrical section in the longitudinal direction.

7. The implant according to claim 5, wherein the area of the implant-sided conical section that is formed without anti-rotation structures forms an end section of the implant-sided conical section opposite the distal end of the implant-sided arrangement area in the direction of the longitudinal direction.

8. The implant according to claim 7, wherein the contact surfaces form a first implant-sided taper angle with the longitudinal direction.

9. The implant according to claim 8, wherein the first implant-sided taper angle is within a range of 8° to 14°.

10. The implant according to claim 9, wherein the first implant-sided taper angle is within a range of 10° to 12°.

11. The implant according to claim 1, wherein the implant-sided conical section forms a distal end of the implant-sided arrangement area in the direction of the longitudinal direction.

12. The implant according to claim 1, wherein the cylindrical section joins the implant-sided conical section in the longitudinal direction.

13. The implant according to claim 1, wherein the implant-sided arrangement area has a threaded section.

14. The implant according to claim 13, wherein the threaded section joins the cylindrical section in the longitudinal direction.

15. The implant according to claim 1, wherein the area of the implant-sided conical section that is formed without anti-rotation structures forms an end section of the implant-sided conical section opposite the distal end of the implant-sided arrangement area in the direction of the longitudinal direction.

16. An implant system, comprising:
a dental implant including:
an implant-sided arrangement area on an inside of the dental implant;
   wherein the implant-sided arrangement area is configured to contact an abutment at least in sections;
   wherein the implant-sided arrangement area has a cylindrical section, and wherein the cylindrical section is configured to form an axial guide for the abutment;
   wherein the implant-sided arrangement area has an implant-sided conical section;
   wherein the implant-sided conical section has implant-sided anti-rotation structures;
   wherein the dental implant extends in a longitudinal direction;
   wherein the implant-sided anti-rotation structures are configured to positively prevent rotation of the abutment about the longitudinal direction relative to the implant;
   wherein each of the implant-sided anti-rotation structures: 1) have at least one contact surface and/or: 2) are formed by at least one contact surface;
   wherein the contact surfaces are flat and define a normal which lies in a plane spanned by a radial direction and the longitudinal direction;
   wherein the implant sided anti-rotation structures are tapered in the direction of the longitudinal direction;
   wherein the implant-sided conical section has an area which is formed without anti-rotation structures; and
a connecting threaded pin.

17. The implant system according to claim 16, wherein the abutment includes a connecting area on an outside;
   wherein the connection area is adapted to contact at least in sections the dental implant;
   wherein the connecting area has a body-sided conical section;
   wherein the body-sided conical section has body-sided anti-rotation structures;
   wherein the abutment extends in a longitudinal extension direction; and
   wherein the abutment-sided anti-rotation structures are configured to positively prevent a rotation of the abutment about the longitudinal extension direction relative to the implant.

18. The implant system according to claim 17, wherein the body-sided anti-rotation structures extend exclusively in the body-sided conical section.

* * * * *